(12) United States Patent
Alexander et al.

(10) Patent No.: US 7,962,741 B1
(45) Date of Patent: Jun. 14, 2011

(54) SYSTEMS AND METHODS FOR PROCESSING PACKETS FOR ENCRYPTION AND DECRYPTION

(75) Inventors: Thomas Alexander, Sunnyvale, CA (US); Steven Ahlgrim, Mountain View, CA (US); Jing Zhang, Milpitas, CA (US); Jessica Ming Chang, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1541 days.

(21) Appl. No.: 10/241,478

(22) Filed: Sep. 12, 2002

(51) Int. Cl.
*H04L 29/06* (2006.01)
*G06F 12/14* (2006.01)
*G06F 15/16* (2006.01)

(52) U.S. Cl. ............ 713/151; 713/160; 713/192; 726/3; 709/230

(58) Field of Classification Search .............. 726/3, 2; 713/192, 193, 151, 160; 380/28; 709/230, 709/232
See application file for complete search history.

(56) References Cited

U.S. PATENT DOCUMENTS

| | | | | |
|---|---|---|---|---|
| 5,303,302 A * | 4/1994 | Burrows | ............. | 713/161 |
| 5,303,303 A * | 4/1994 | White | ............. | 713/160 |
| 5,319,712 A * | 6/1994 | Finkelstein et al. | ............. | 380/44 |
| 5,321,752 A * | 6/1994 | Iwamura et al. | ............. | 713/174 |
| 5,386,471 A * | 1/1995 | Bianco | ............. | 713/162 |
| 5,442,708 A * | 8/1995 | Adams et al. | ............. | 713/153 |
| 5,548,649 A * | 8/1996 | Jacobson | ............. | 713/153 |
| 5,926,546 A * | 7/1999 | Maeda et al. | ............. | 705/65 |
| 5,940,516 A * | 8/1999 | Mason et al. | ............. | 713/159 |
| 6,035,380 A * | 3/2000 | Shelton et al. | ............. | 711/163 |
| 6,055,236 A * | 4/2000 | Nessett et al. | ............. | 370/389 |
| 6,646,985 B1 * | 11/2003 | Park et al. | ............. | 370/229 |
| 6,757,831 B1 * | 6/2004 | Folmsbee | ............. | 713/190 |
| 6,986,061 B1 * | 1/2006 | Kunzinger | ............. | 709/225 |
| 7,266,703 B2 * | 9/2007 | Anand et al. | ............. | 713/189 |
| 7,283,538 B2 * | 10/2007 | Pham et al. | ............. | 370/401 |
| 7,437,548 B1 * | 10/2008 | Alfieri | ............. | 713/150 |
| 7,721,086 B2 * | 5/2010 | Milliken | ............. | 713/153 |
| 2002/0032798 A1 * | 3/2002 | Xu | ............. | 709/238 |
| 2003/0014627 A1 * | 1/2003 | Krishna et al. | ............. | 713/153 |
| 2003/0018908 A1 * | 1/2003 | Mercer et al. | ............. | 713/193 |
| 2003/0149892 A1 * | 8/2003 | Robinson | ............. | 713/201 |
| 2003/0169877 A1 * | 9/2003 | Liu et al. | ............. | 380/28 |

OTHER PUBLICATIONS

S. Kent and R. Atkinson. "IP Authentication Header", Network Working Group Request for Comments 2402. Nov. 1998.*
S. Kent and R. Atkinson. "IP Encapsulating Security Payload (ESP)", Network Working Group Request for Comments 2406. Nov. 1998.*
S. Kent and R. Atkinson, "Security Architecture for the Internet Protocol," Standards Track Memo, Nov. 1998, http://www.ietf.org/rfc/rfc2401.txt, pp. 1-62.

* cited by examiner

*Primary Examiner* — Zachary A Davis
(74) *Attorney, Agent, or Firm* — Harrity & Harrity, LLP

(57) ABSTRACT

A network device for processing data packets includes an encryption services module, a number of network interfaces and a forwarding module. A network interface receives a packet requiring encryption services and forwards the packet. The forwarding module receives at least a portion of the data packet, where the portion includes header information. The forwarding module identifies a security association for the data packet, appends the security association to the portion of the data packet and forwards the portion of the data packet including the security association to the encryption services module. The encryption services module processes the packet in accordance with the security association.

14 Claims, 5 Drawing Sheets

SYSTEMS AND METHODS FOR PROCESSING PACKETS FOR ENCRYPTION AND DECRYPTION

BACKGROUND OF THE INVENTION

1. Field of the Invention

The present invention relates generally to data networks and, more particularly, to processing data packets that require encryption or decryption.

2. Description of Related Art

Internet Protocol security (IPsec) refers to a set of protocols developed by the Internet Engineering Task Force (IETF) to support the secure exchange of packets at the IP layer. To support IPsec, sending and receiving devices execute an Internet Key Exchange (IKE) protocol that establishes parameters associated with encrypting and decrypting packets sent between the sending and receiving devices.

In conventional systems that support IPsec, a general purpose CPU coupled to a memory system receives IP packets and converts the IP packets to IPsec packets. The general purpose CPU performs these operations via software instructions stored in the memory system. This approach has many problems.

One problem associated with converting IP packets to IPsec packets in this manner is that the general purpose CPU is typically unable to provide sufficient performance in high speed systems. That is, the general purpose CPU is unable to generate the IPsec packets quickly enough to support the data rates of many high speed communication systems.

Therefore, there exists a need for systems and methods that improve the processing associated with supporting IPsec.

SUMMARY OF THE INVENTION

Systems and methods consistent with the present invention address this and other needs by using a hardware-based pipeline to process packets in accordance with IPsec protocol. Each stage in the pipeline performs a portion of an IPsec-related operation. Using a hardware pipeline enables a router to maintain high data throughput when performing IPsec operations.

In accordance with the principles of the invention as embodied and broadly described herein, a network device including at least one network interface, a forwarding module and an encryption services module is provided. The network interface is configured to receive a data packet requiring encryption-related processing and forward the data packet. The forwarding module is configured to receive information regarding the data packet, identify a security association for the data packet, and include the security association with the information regarding the data packet. The forwarding module is also configured to forward the information regarding the data packet including the security association. The encryption services module is configured to receive the information regarding the data packet including the security association and process the packet in accordance with the security association.

In another implementation consistent with the principles of the invention, a method for processing data packets in a network device includes receiving a data packet requiring encryption-related processing. The method also includes identifying a security association for the data packet and forwarding the data packet to an encryption services card. The method further includes processing the data packet by the encryption services card in accordance with the security association for the data packet.

In a further implementation consistent with principles of the invention, a pluggable card for performing encryption-related services associated with data packets received by a network device is provided. The pluggable card includes a number of logic devices configured in a pipeline, where each logic device corresponds to a stage in the pipeline and performs encryption-related processing for a data packet. The pluggable card also includes an encryptor device for encrypting and decrypting the data packet.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Figure 1:
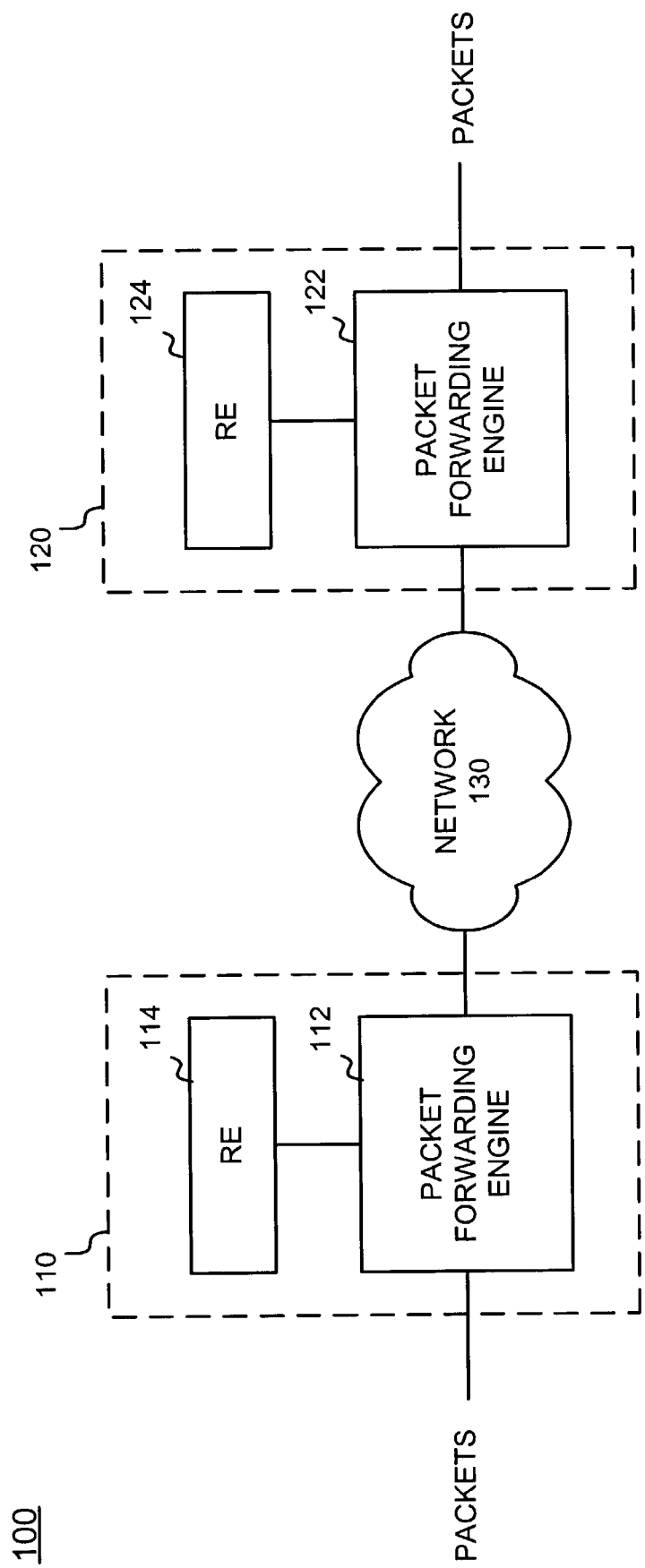
FIG. 1 is a diagram of an exemplary system in which systems and methods consistent with principles of the invention may be implemented.

FIG. 1 is a diagram of an exemplary system 100 in which systems and methods consistent with principles of the invention may be implemented. System 100 includes router 110 and router 120 connected via network 130. Network 130 may include, for example, a local area network (LAN), a wide area network (WAN), an intranet, the Internet and/or some other similar type of network. Router I/O may include packet forwarding engine (PFE) 112 and routing engine (RE) 114 and router 120 may include PFE 122 and RE 124.

PFE 112 may receive one or more packet streams on physical links connected to a network, such as a WAN, LAN, the Internet, wireless network, or another network. Each physical link could be one of many types of transport media, such as optical fiber or Ethernet cable. The packets on the physical link may be formatted according to one of several protocols, such as the synchronous optical network (SONET) standard or Ethernet. The packets may also be formatted according to IPsec protocol, as described in more detail below. PFE 112 processes the stream(s) to determine destination information and transmits the stream(s) on one or more links based on the destination information.

In an exemplary implementation, PFE 112 may receive clear text packets (i.e., unencrypted data packets) from a network link, encrypt the data packets and transmit the encrypted data packets to another device, such as router 120. Router 120 may receive the encrypted data packets, decrypt the data packets and transmit clear text packets via a network link. PFE 112 may also receive encrypted packets and decrypt the packets in accordance with a predetermined protocol, such as the IPsec protocol.

RE 114 may include processing logic that performs high-level management functions for router 110. For example, RE 114 may communicate with other networks and systems connected to router 110 to exchange information regarding network topology and network protocol information. RE 114 may create routing tables based on network topology information, create forwarding tables based on the routing tables and send the forwarding tables to PFE 112. PFE 112 uses the forwarding tables to perform a route lookup for incoming packets. RE 114 also performs other general control and monitoring functions for router 110.

For example, in an exemplary implementation consistent with the present invention, RE 114 may execute an Internet Key Exchange (IKE) protocol to establish tunnels with other routers, such as router 120. The IKE protocol essentially defines all the parameters of the tunnel, such parameters are referred to as a security association. In an exemplary implementation, RE 114 and RE 124 each execute the IKE protocol and exchange information associated with setting up the tunnel. Such information may include address information identifying the tunnel endpoints, encryption keys to use when encrypting/decrypting packets and the type of encryption algorithms to use when encrypting data packets. After the tunnel is established, routers 110 and 120 may send packets between themselves in a secure manner. PFE 122 and RE 124 may perform similar functions as PFE 112 and RE 114, respectively.

Exemplary Network Device Configuration

Figure 2:
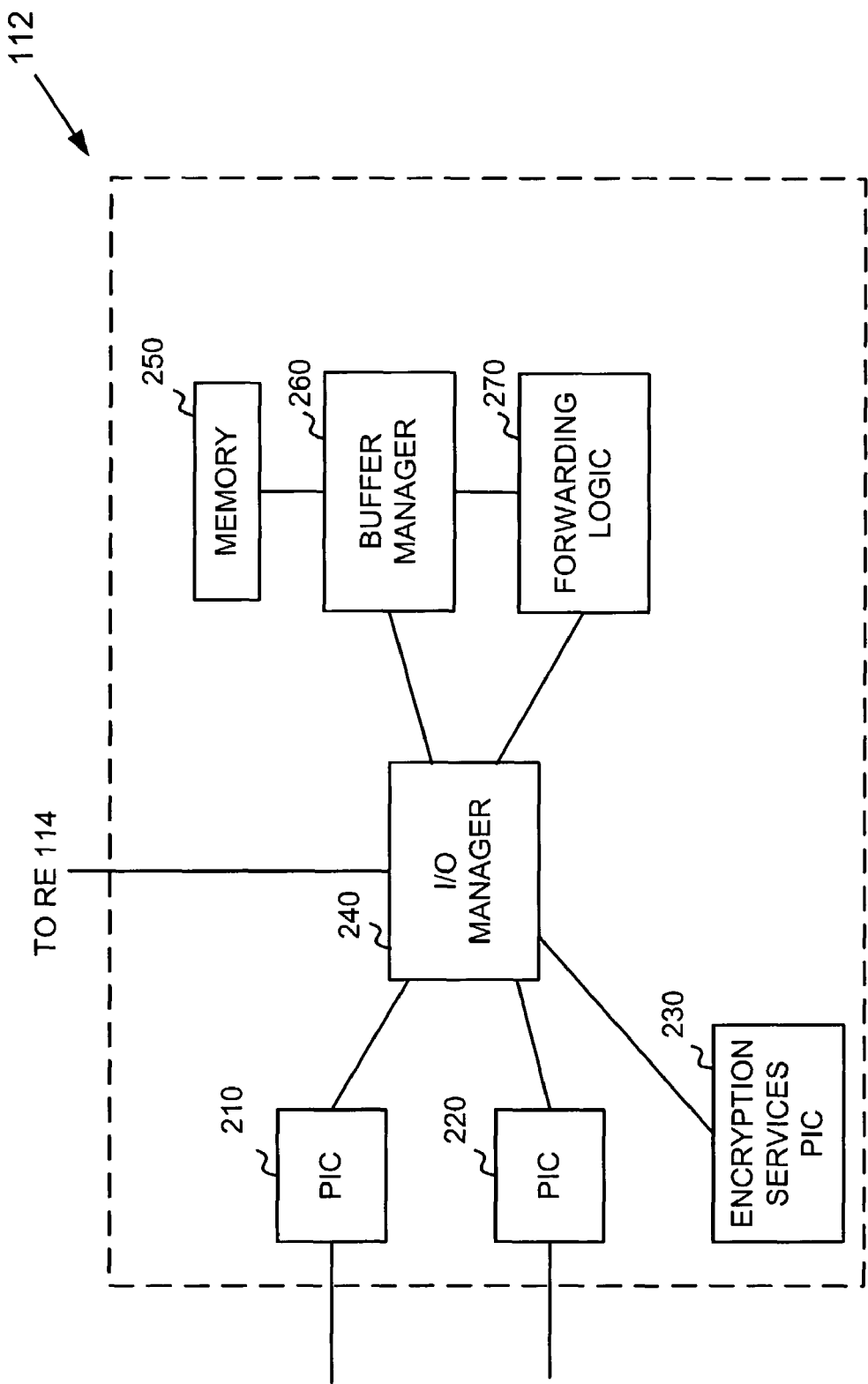
FIG. 2 is an exemplary diagram of a portion of the packet forwarding engine of FIG. 1 according to an implementation consistent with principles of the invention.

FIG. 2 is an exemplary detailed diagram of a portion of PFE 112 according to an implementation consistent with the principles of the invention. PFE 112 may include physical interface cards (PICs) 210 and 220, encryption services (ES) PIC 230, I/O manager 240, memory 250, buffer manager 260 and forwarding logic 270. It should also be understood that PFE 112 may include additional or other devices. For example, while two PICs, 210 and 220, and one ES PIC 230 are shown in FIG. 2, there may be more or fewer PICs in other implementations.

In an exemplary implementation, PICs 210 and 220 connect to physical links and I/O manager 240 to transport data between the physical links and I/O manager 240. Each of PICs 210 and 220 includes interfacing, processing, and memory elements necessary to transmit data between a physical link and I/O manager 240. In addition, each of PICs 210 and 220 may be designed to handle a particular type of physical link. For example, a particular PIC may be provided to handle Ethernet communications.

For incoming data, PICs 210 and 220 may perform control functions tailored to one or more particular media types associated with that PIC. For example, PICs 210 and 220 may be associated with a fiber optic or digital transmission link on which data packets are received. In each case, PICs 210 and 220 may pass the packets to I/O manager 240 for further processing. For outgoing data, PICs 210 and 220 may receive packets from I/O manager 240 and transmit packets on the physical link.

I/O manager 240 may process data flowing in two directions: a first direction corresponding to processing packet data received from PICs 210/220 or ES PIC 230 and a second direction corresponding to processing packet data received from forwarding logic 270 or buffer manager 260.

In the first direction, I/O manager 240 may process packets received from one of the PICs, convert the packets into data units, and transmit the data units to buffer manager 260. Data units are the data structure used internally by PFE 112 for transporting and storing data. In one implementation, data units are 64 bytes in length. For outgoing data, I/O manager 240 reassembles data units into data packets for output via one of PICs 210 and 220.

In an exemplary implementation, buffer manager 260 and forwarding logic 270 form a switching and forwarding module that processes the data packets received from I/O manager 240. Buffer manager 260 receives the data units and stores the data units in memory 250. Memory 250 may be implemented as one or more memory devices, although only one is shown in FIG. 2 for simplicity. Buffer manager 260 also may develop a collection of control information associated with a data packet. In an exemplary implementation, the control information may include information extracted from the packet, such as the IP header of the data packet (e.g., an IPv4 or IPv6 header) that includes the source and destination of the packet. The control information may also include information indicating the location of each data unit of the packet stored in memory 250. In one implementation, instead of storing addresses in the control information, only the address of the first data unit is stored in the control information, and the remaining data unit locations are identified in the control information by offsets from the address of the preceding data unit. The control information may further include other information, such as the protocol of the packet, quality of service (QoS) information, validity information, priority information, and data length information.

After storing the data units in memory 250 and developing the control information, buffer manager 260 sends the control information to forwarding logic 270. Forwarding logic 270 may perform a route lookup based on the control information. For example, forwarding logic 270 may perform a route lookup based on the packet header information included in the control information to identify the destination for the packet. Forwarding logic 270 forwards the destination information to I/O manager 240, which reassembles the data packet and forwards the data packet to an appropriate PIC, such as PIC 210, PIC 220 or ES PIC 230.

ES PIC 230 may perform IPsec operations for PFE 112. According to an exemplary implementation consistent with principles of the invention, forwarding logic 270 identifies packets requiring IPsec services and forwards these packets to ES PIC 230, as described in more detail below.

For example, the control information may indicate that a data packet is destined for a router in which a tunnel has been established. The tunnel, as described previously, may have a security association (SA) that has been set up via IKE protocol. In an exemplary implementation consistent with the principles of invention, the control information may include a security parameter index (SPI). The control information may also include a source address and destination address for a clear text (i.e., unencrypted) packet. Forwarding logic 270 may map the SPI and/or the source address/destination address to an SA index and append the SA index to the control information. The SA index may then be used when processing the packet, as described in more detail below. Forwarding logic 270 forwards the control information with the SA index appended to the I/O manager 240. Forwarding logic 270 may also append a program type field to the control information to indicate how the packet is to be processed by ES PIC 230. I/O manger 240 receives the control information with the appended information and sends the data packet to ES PIC 230 for further processing.

Alternatively, a packet that is received by I/O manager 240 may be encrypted. In this case, forwarding logic 270 may determine that the packet is to be decrypted and sends the packet with the appropriate SA index and program type information to ES PIC 230 for decryption.

Figure 3:
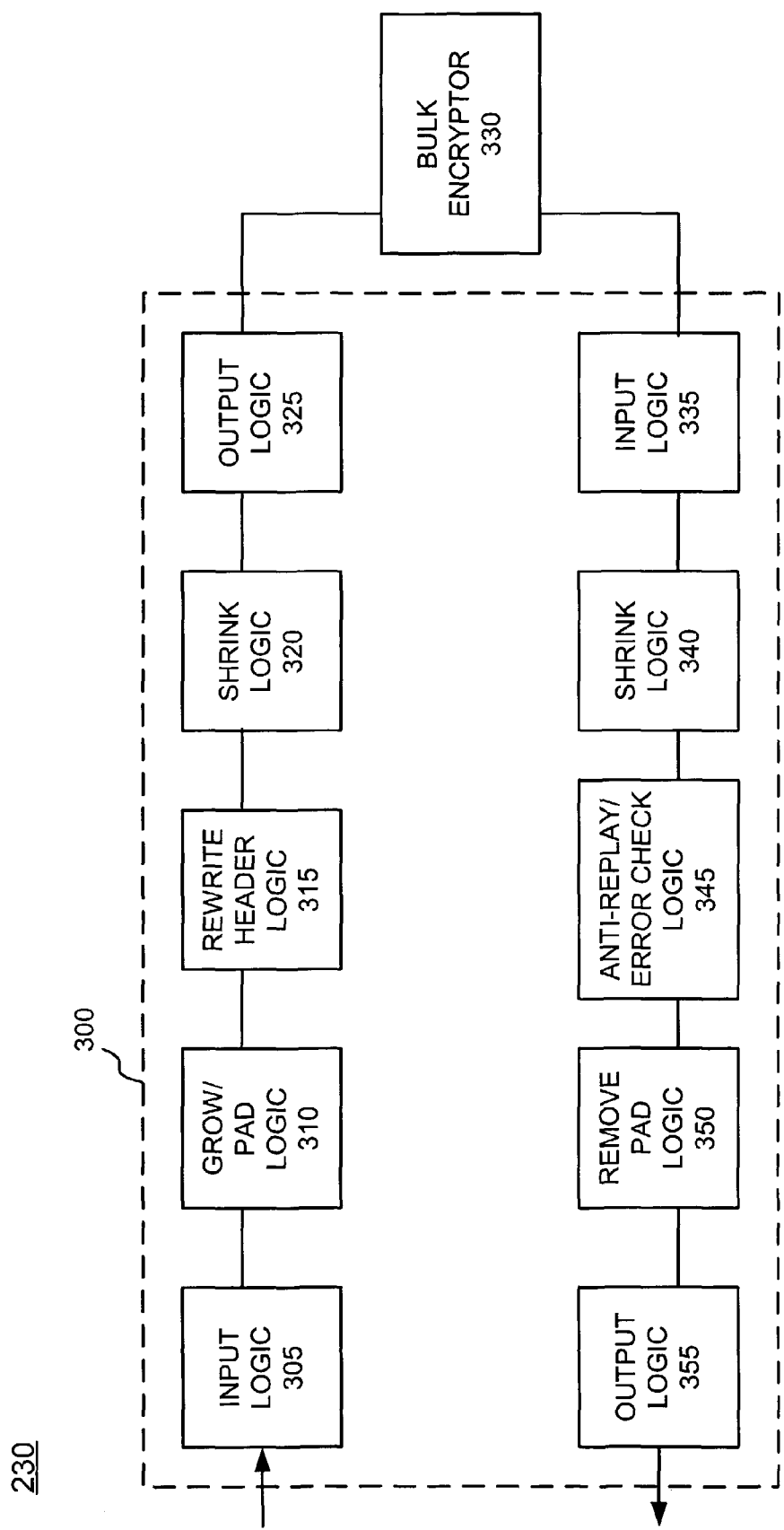
FIG. 3 is an exemplary diagram of a portion of the encryption services physical interface card of FIG. 2 according to an implementation consistent with principles of the invention.

FIG. 3 is an exemplary diagram of a portion of ES PIC 230 according to an implementation consistent with principles of the invention. ES PIC 230 may provide standards-compliant encryption/decryption functionality to support data traffic at wire speeds. ES PIC 230, consistent with principles of the present invention, may perform IPsec operations using a hardware-based pipeline. Each stage in the pipeline performs a portion of an IPsec operation.

In the exemplary implementation illustrated in FIG. 3, the pipeline includes an IPsec processor 300 and a bulk encryptor 330. IPsec processor 300 may include input logic 305, grow/pad logic 310, rewrite header logic 315, shrink logic 320, output logic 325, input logic 335, shrink logic 340, anti-replay and error check logic 345, remove pad logic 350, and output logic 355. In one embodiment, each of these logic devices in IPsec processor 300 may include a micro-coded hardware engine that performs a portion of the operations associated with generating an IPsec-compliant packet. In general, IPsec processor 300 receives a data packet, such as an IPv4 or IPv6 data packet, and along with bulk encryptor 330 converts the data packet into an IPsec-compliant data packet.

As discussed previously, the requirements for converting an IP data packet into an IPsec data packet are known. The present invention, however, advantageously breaks up the conversion process into a number of stages implemented in a hardware pipeline. The partitioning of the process into the stages illustrated in FIG. 3 enables router 110 to perform IPsec operations while maintaining high data throughput. The particular operations performed by each stage in the pipeline will be discussed below.

Input logic 305 receives a data packet from I/O manager 240 and passes the packet to grow/pad logic 310. Grow/pad logic 310 reformats the packet in accordance with the program type information included with the packet. As discussed previously, forwarding logic 270 may add program type information to the packet and this program type information may be used to determine how the packet will be processed, in accordance with IPsec. For example, grow/pad logic 310 may receive an IPv4 packet and scatter or spread the data out by inserting additional fields that may be used later to add encryption-related information based on the program type information. Grow/pad logic 310 may also add one or more pad bits to align the data packet in accordance with IPsec protocol.

Rewrite header logic 315 receives the packet from grow/pad logic 310 and processes the packet based on the program type information included with the packet. For example, the program type may be encapsulating security payload (ESP), which indicates how the packet is to be processed. Alternatively, the program type may be another program type used in accordance with IPsec protocol. In each case, rewrite header logic 315 rewrites the header of the packet based on the program type. For example, the program type may indicate that a new outer IP header that contains IP addresses of security gateways should be added to the data packet. Rewrite header logic 315 may also add a sequence number to the packet. The sequence number may be used for anti-replay checking, as described in more detail below.

Shrink logic 320 effectively shrinks the packet by gathering the relevant parts of the packet needed for encryption/decryption. Shrink logic 320 removes portions of the packet that are not needed during the encrypting/decrypting. Output logic 325 receives the packet from shrink logic 320 and passes the packet to bulk encryptor 330.

Bulk encryptor 330 encrypts or decrypts the packet based on the SA included with the packet. Bulk encryptor 330 may access a key generator accelerator (not shown) to retrieve the necessary encryption/decryption keys associated with performing the encryption/decryption. Alternatively, bulk encryptor 330 may have the keys associated with performing the encryption/decryption prestored in its memory. After bulk encryptor 330 encrypts/decrypts the packet, bulk encryptor 330 may add status information to the end of the packet. The logic devices located downstream in the pipeline may, for example, use this status information to determine whether they should accept the packet or drop the packet. For example, bulk encryptor 330 may calculate a checksum and compare the calculated checksum to a checksum included with the packet. Bulk encryptor 330 may include checksum comparison information with the data packet indicating whether the checksums are not the same.

Input logic 335 receives the packet from bulk encryptor 330 and forwards the packet to shrink logic 340. Input logic 335 may buffer the packet, if necessary. Shrink logic 340 removes unnecessary information added to the packet that is not needed for forwarding or other purposes. Anti-replay and error check logic 345 may identify whether the packet is a duplicate packet using a sequence number included with the packet. The sequence number, as described previously, may be added by rewrite header logic 315. If the packet is a duplicate packet, anti-replay and error check logic 345 may drop the packet. Anti-replay and error check logic 345 may also determine whether the packet has been tampered with or corrupted. For example, as discussed previously, bulk encryptor 330 may include checksum comparison information with the data packet that indicates whether the checksum comparison resulted in a failure (i.e., the checksums did not match). Anti-replay and error check logic 345 determines whether the packet should be dropped based on the checksum comparison information. Assuming that the packet is not a duplicate and has not been tampered with, anti-replay and error check logic 345 forwards the packet to remove pad logic 350.

Remove pad logic 350 may remove padding such as the padding previously added. Output logic 355 receives the packet from remove pad logic 355 and forwards the IPsec-compliant packet back to I/O manager 240 for further processing, as described in more detail below. Output logic 355 may buffer the packet, if necessary.

In an exemplary implementation consistent with principles of the invention, each of the stages of the IPsec processor 300 pipeline may perform its processing in a predetermined number of clock cycles. In addition, the pipeline stages represented by input logic 305 and 335 may be combined with their respective succeeding stages in the pipeline. Similarly, the pipeline stages represented by output logic 325 and 355 may be combined with their respective preceding stages. In other words, IPsec processor 300 may essentially be considered to include six stages represented by engines 310, 315, 320, 340, 345 and 350. Each of these engines may be designed to have its respective processing results ready in a predetermined number of clock cycles, based on the clock frequency. For example, in one implementation using a 62.5 MHz clock, each of the engines may provide its processing results every 40 clock cycles to enable the ES PIC 230 to attain high data throughput.

In any event, IPsec processor 300 and bulk encryptor 330 perform encryption/decryption related services for a number of PICs in router 110. Using a specialized PIC, such as ES PIC 230, to perform IPsec-related services, as opposed to performing the IPsec operations within each PIC, has many advantages, such as reducing the number of components needed to support IPsec.

Exemplary Processing

Figure 4:
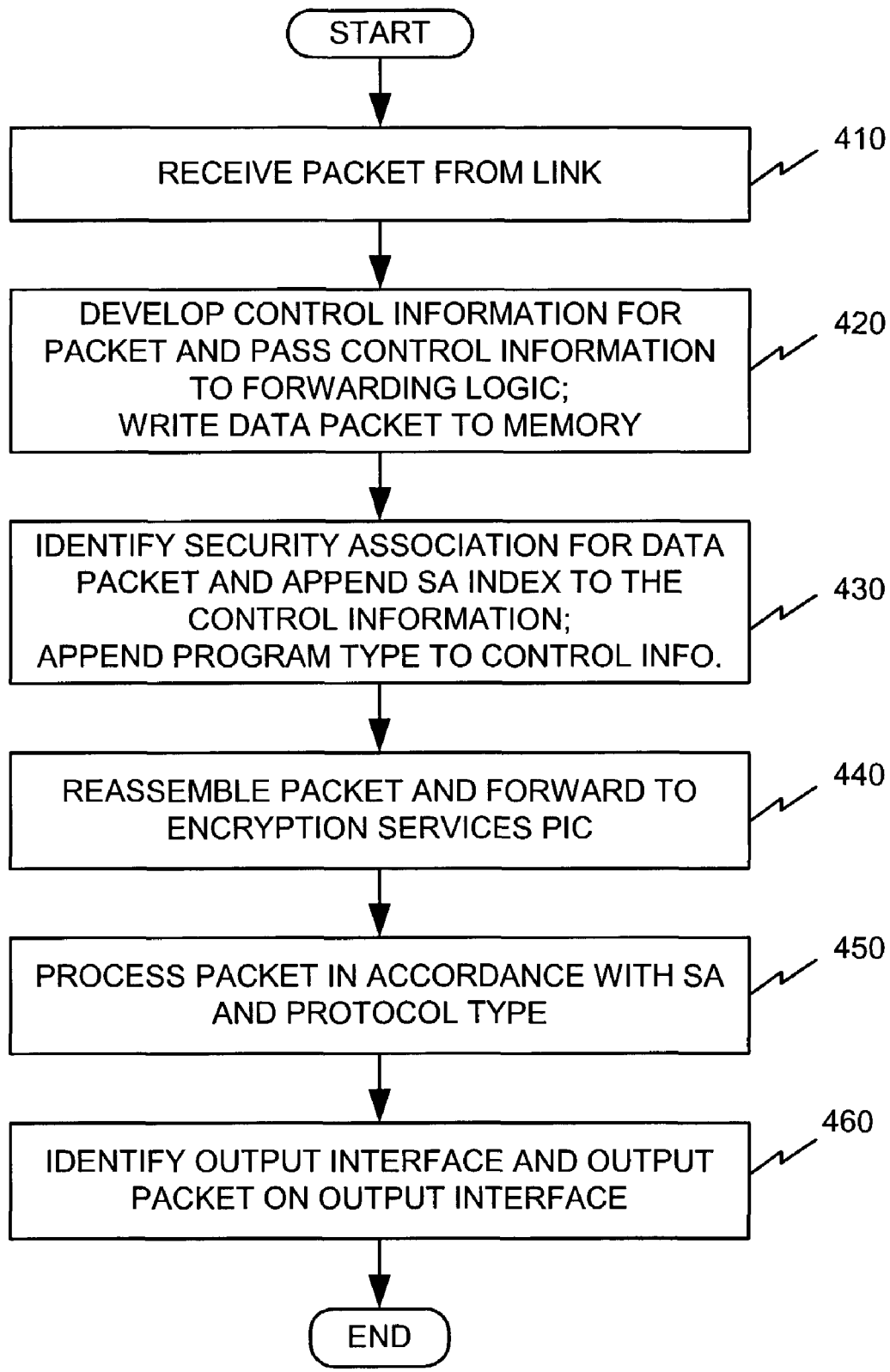
FIGS. 4 and 5 are flow diagrams of exemplary processing associated with processing a data packet according to an implementation consistent with principles of the invention.
Figure 5:
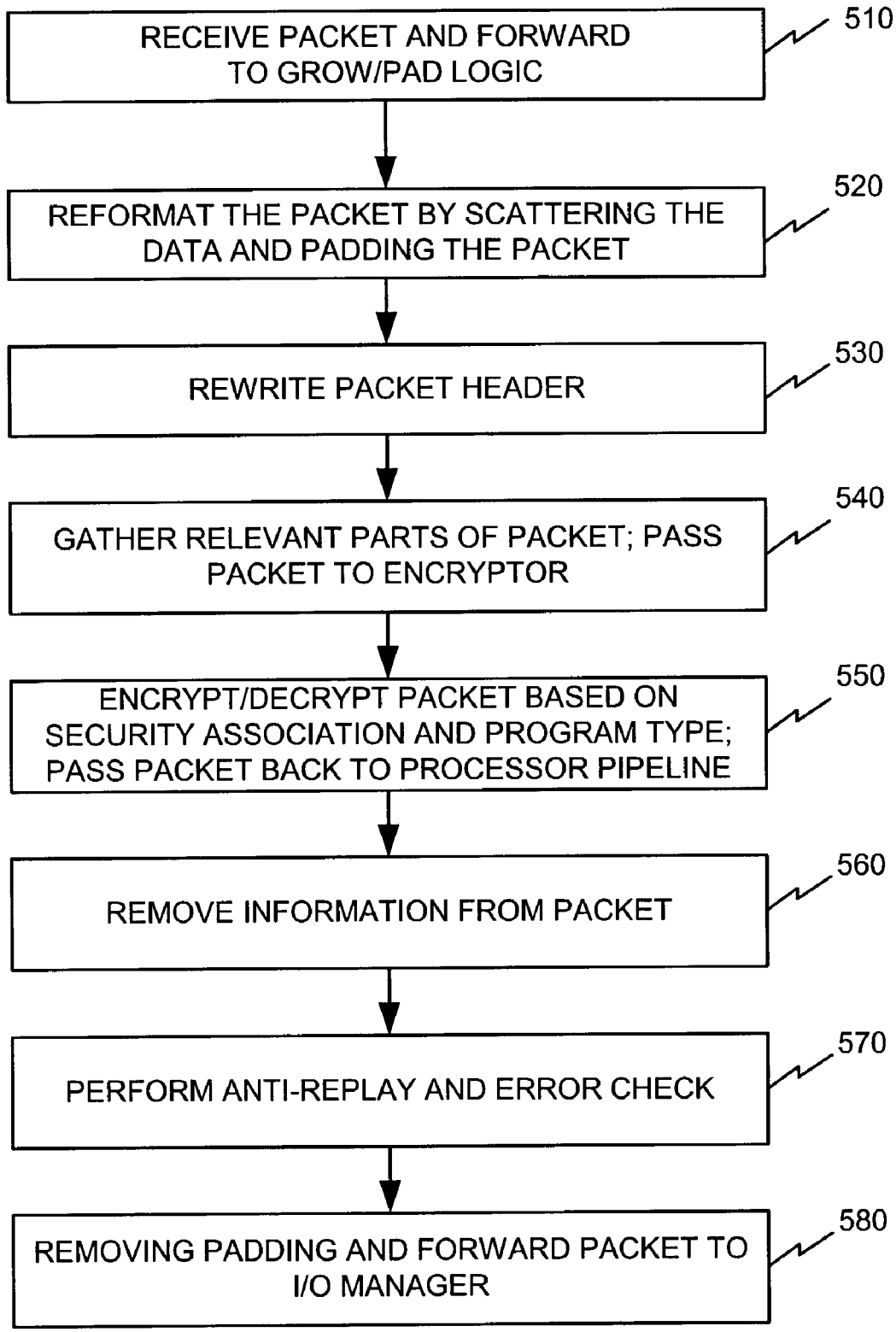

FIGS. 4 and 5 are flow diagrams illustrating exemplary processing associated with processing a data packet according to an implementation consistent with principles of the invention. Processing may begin with PIC 210 receiving data packets from the link (act 410). Assume that PIC 210 receives a packet that requires encryption-related processing. For example, assume that the packet is destined for a router with which router 110 has established a tunnel in accordance with IPsec protocol.

PIC 210 forwards the packet to I/O manager 240, which may then forward the packet to buffer manager 260. Buffer manager 260 may develop control information for the data packet that may include packet header information. Buffer manager 260 may pass the control information to forwarding logic 270 (act 420). Buffer manager 260 may also write the packet to memory 250 (act 420).

Forwarding logic 270 may identify that the packet requires IPsec-related processing and map the packet to a security association (SA). For example, forwarding logic 270 may map an SPI value and/or source address/destination address information included with the control information to an SA index for the packet. That is, forwarding logic 270 may include a table that maps the SPI to an SA index. The table may also map source address/destination address information to an SA index. In either case, forwarding logic 270 identifies a particular SA index associated with the packet and includes the SA index with the control information (act 430). Forwarding logic 270 may also include a program type field with the control information (act 430). The SA index and program type field may be used by ES PIC 230 in processing the packet.

Forwarding logic 270 then forwards the control information to I/O manager 240. I/O manager 240 receives the control information and determines that the packet is destined for ES PIC 230. I/O manager 240 also reassembles the packet using the control information and forwards the packet to ES PIC 230 (act 440). From the standpoint of I/O manager 240, when the packet is output to ES PIC 230, the packet is a complete packet that is being output from router 110, even though the packet remains on router 110 and requires further processing by ES PIC 230.

Encryption PIC 230 receives the packet and processes the packet in accordance with IPsec protocol (act 450). FIG. 5 illustrates exemplary processing associated with the IPsec processing performed in act 450.

Input logic 305 (FIG. 3) receives the packet and forwards the packet to grow/pad logic 310 (FIG. 5, act 510). Grow/pad logic 310 reformats the packet by scattering the data packet (e.g., adding various fields that may be used to insert encryption information in accordance with IPsec protocol) based on the SA and program type included with the data packet (act 520). Grow/pad logic 310 may also add pad bit(s) to align the data packet in accordance with IPsec protocol (act 520). After adding the various fields and pad bit(s), grow/pad logic 310 forwards the packet to rewrite header logic 315.

Rewrite header logic 315 processes the packet based on the program type information included with the packet. For example, rewrite header logic 315 may rewrite the header of the packet based on the program type (act 530). The rewritten header may include, for example, a new outer IP header that contains an IP address of a security gateway. In alternative implementations, rewrite header logic 315 may include other fields and make other changes to the header included with the data packet, consistent with IPsec protocol. Rewrite header logic 315 may also add a sequence number to the packet. After rewriting the header, rewrite header logic 315 forwards the packet to shrink logic 320.

Shrink logic 320 gathers the relevant parts of the packet needed for encryption/decryption and removes any information that is not needed during the encrypting/decrypting (act 540). Shrink logic 320 then forwards the packet to output logic 325, which passes the packet to bulk encryptor 330.

Bulk encryptor 330 receives the packet and encrypts or decrypts the packet based on the SA and program type included with the packet (act 550). Bulk encryptor 330 may perform the encryption/decryption using prestored keys associated with performing the encryption/decryption or retrieve the necessary keys from a key generator accelerator. After bulk encryptor 330 encrypts/decrypts the packet, bulk encryptor 330 may add status information, such as checksum comparison information, to the end of the packet. For example, as discussed previously, bulk encryptor 330 may calculate a checksum, compare the calculated checksum to the checksum included with the packet and include comparison information indicating whether the comparison passed/failed. The logic devices located downstream in the pipeline may use this status information to determine whether they should accept the packet or drop the packet.

After encrypting/decrypting the packet and adding the necessary status information, bulk encryptor 330 passes the packet back to IPsec processor 300 at input logic 335 (act 550). Input logic 335 forwards the packet to shrink logic 340. Shrink logic 340 removes information from the packet that is not needed for forwarding or other purposes (act 560). Shrink logic 340 then forwards the packet to anti-replay and error check logic 345.

Anti-replay and error check logic 345 may identify whether the packet is a duplicate packet using, for example, a sequence number included with the packet (act 570). The sequence number, as described previously, may be added by rewrite header logic 315. If the packet is a duplicate packet, anti-replay and error check logic 345 may drop the packet. Anti-replay and error check logic 345 may also determine whether the packet has been tampered with or corrupted (act 570). For example, anti-replay and error check logic 345 may determine that the packet should be dropped when the checksum comparison information indicates that the checksums did not match. Assuming that the packet is not a duplicate and has not been tampered with, anti-replay and error check logic 345 forwards the packet to remove pad logic 350.

Remove pad logic 350 removes the padding previously added by grow/pad logic 310 and forwards the packet to output logic 355 (act 580). Output logic 355 may then forward the processed packet back to I/O manager 240 (act 580). The processed packet received by I/O manager is an IPsec-compliant packet.

I/O manager 240 receives the IPsec packet and treats the packet in the same manner as any incoming packet received on one of PICs 210 or 220. For example, I/O manager 240 may send the packet to buffer manager 260, which stores the packet in memory 250. Buffer manager 260 may also extract control information and forward the control information to forwarding logic 270. Forwarding logic 270 may identify forwarding information for the packet, such as an output PIC, based on the control information and send the control information with the forwarding information back to I/O manager 240 (FIG. 4, act 460). I/O manager 240 may then forward the packet for output via one of PICs, such as PIC 220, based on the forwarding information (act 460).

CONCLUSION

Systems and methods consistent with the principles of the invention provide a mechanism for processing secure packets in accordance with a security scheme, such as the IPsec protocol. A processing card is used to provide services for any number of PICs on which packets may be received. The processing card uses a hardware pipeline to process the packets in accordance with the security scheme and forwards compliant packets back to router logic that identifies forwarding information for the packet. This enables the router to maintain high data throughput while processing packets in accordance with security schemes.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, certain portions of the invention have been described as "logic" that performs one or more functions. This logic may include hardware, such as an application specific integrated circuit (ASIC) or a field programmable gate array (FPGA), software or a combination of hardware and software. Further, while series of acts have been described in relation to FIGS. 4 and 5, the order of the acts may vary in other implementations. Moreover, non-dependent acts may be performed in parallel.

In addition, while systems and methods have been described in terms of a network device, such as a router, the present invention may have applicability in other devices, such as switches, where security processing, such as IPsec processing, may be required. Systems and methods consistent with the principles of the invention may also be used to support other security protocols. Lastly, while some processing has been described as being performed by particular components of the network device, it should be understood that the processing described as being performed by one component may be performed by other components in alternative implementations of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A network device for processing a data packet, the network device comprising:
   at least one network interface to:
      receive the data packet, the data packet requiring encryption-related processing, and
      forward the data packet;
   a forwarding module to:
      receive information regarding the data packet,
      identify security association information for the data packet,
      include the security association information with the information regarding the data packet, and
      forward the information regarding the data packet including the security association information; and
   an encryption services module, which is separate from the forwarding module, to:
      receive the information regarding the data packet including the security association information, and
      process the data packet in accordance with the security association information,
   where the encryption services module comprises a plurality of hardware-implemented logic engines corresponding to stages in a pipeline, where:
      a first one of the plurality of hardware-implemented logic engines is to at least one of add a field to the data packet or add padding to the data packet,
      a second one of the plurality of hardware-implemented logic engines is to receive the data packet from the first one of the plurality of hardware-implemented logic engines and rewrite a header of the data packet,
      a third one of the plurality of hardware-implemented logic engines is to receive the data packet from the second one of the plurality of hardware-implemented logic engines and remove at least one field from the data packet,
      a fourth one of the plurality of hardware-implemented logic engines is to receive the data packet from the third one of the plurality of hardware-implemented logic engines and at least one of encrypt or decrypt the data packet, and is to add, to the data packet, status information to be used by a down stream hardware-implemented logic engine to determine whether to accept or drop the data packet,
      a fifth one of the plurality of hardware-implemented logic engines is to receive the data packet after processing by the fourth hardware-implemented logic engine, and remove at least one field from the data packet,
      a sixth one of the plurality of hardware-implemented logic engines is to receive the data packet from the fifth one of the plurality of hardware-implemented logic engines and at least one of error check the data packet or perform anti-replay checking, and
      a seventh one of the plurality of hardware-implemented logic engines is to receive the data packet from the sixth one of the plurality of hardware-implemented logic engines and remove padding from the data packet.

2. The network device of claim 1, where the fourth hardware-implemented logic engine is to at least one of encrypt or decrypt the data packet in accordance with the security association information.

3. The network device of claim 1, where the forwarding module is further to:
   include program type information with the data packet; and
   where the encryption services module is to:
      process the data packet in accordance with the security association information and the program type information.

4. The network device of claim 1, where the encryption services module is to:
   forward the processed packet to the forwarding module; and where the forwarding module is further to:
      process the packet to identify an output interface, and
      forward the processed packet to the identified output interface.

5. The network device of claim 1, where the encryption services module is located on a card, the card being located separate from the at least one network interface and the forwarding module.

6. The network device of claim 1, where the encryption services module comprises a printed circuit card separate from the at least one network interface.

7. A method for processing data packets in a network device, the method comprising:
    receiving, at a forwarding module, a data packet requiring encryption-related processing;
    identifying, using the forwarding module, security association information for the data packet;
    forwarding the data packet, and the security association information, to an encryption services card that is separate from the forwarding module; and
    processing the data packet, by the encryption services card, using a plurality of pipelined hardware engines and in accordance with the security association information for the data packet, the processing comprising:
        using a first one of the pipelined hardware engines to at least one of add a field to the data packet or add padding to the data packet,
        receiving, at a second one of the pipelined hardware engines, the data packet from the first one of the pipelined hardware engines and rewriting, using the second one of the pipelined hardware engines, a header of the data packet,
        receiving, at a third one of the pipelined hardware engines, the data packet from the second one of the pipelined hardware engines and removing, using the third one of the pipelined hardware engines, at least one field from the data packet,
        receiving, at a fourth one of the pipelined hardware engines, the data packet from the third one of the pipelined hardware engines and encrypting or decrypting, using the fourth one of the engines, the data packet, and adding status information, using the fourth one of the pipelined hardware engines, to the data packet, where the status information is to be used by a down stream pipelined hardware engine to determine whether to accept or drop the data packet,
        receiving, at a fifth one of the pipelined hardware engines, the data packet from the fourth one of the pipelined hardware engines and removing, using the fifth one of the pipelined hardware engines, at least one field from the data packet,
        receiving, at a sixth one of the pipelined hardware engines, the data packet from the fifth one of the pipelined hardware engines and checking the data packet for errors or performing anti-replay checking, using the sixth one of the pipelined hardware engines, and
        receiving, at a seventh one of the pipelined hardware engines, the data packet from the sixth one of the pipelined hardware engines and removing, using the seventh one of the pipelined hardware engines, padding from the data packet.

8. The method of claim 7, further comprising:
    identifying a program type for the data packet;
    including the security association information and the program type with the data packet prior to forwarding the data packet to the encryption services card; and
    processing the data packet, by the encryption services card, in accordance with the security association information and the program type.

9. The method of claim 7, where the plurality of pipelined hardware engines comprises a plurality of micro-coded pipelined hardware engines.

10. The method of claim 7, further comprising:
    forwarding the processed data packet, by the encryption services card, to an input/output manager;
    identifying an output interface for the processed data packet; and
    forwarding the processed data packet to the output interface.

11. A system comprising:
    one or more processing devices to:
        receive a data packet;
        determine whether the data packet requires encryption-related processing; and
        forward the data packet to an encryption services module, when the data packet requires encryption-related processing; and
    a plurality of hardware-implemented pipelined processing devices to process the data packet, where the plurality of hardware-implemented pipelined processing devices includes:
        a first hardware-implemented pipelined processing device to at least add a field to the data packet or add padding to the data packet,
        a second hardware-implemented pipelined processing device to receive the data packet from the first hardware-implemented pipelined processing device and rewrite the header of the data packet,
        a third hardware-implemented pipelined processing device to receive the data packet from the second hardware-implemented pipelined processing device and remove least one field from the data packet,
        a fourth hardware-implemented pipelined processing device to receive the data packet from the third hardware-implemented pipelined processing device and encrypt or decrypt the data packet, and add, to the data packet, status information to be used by a down stream hardware-implemented pipelined processing device to determine whether to accept or drop the data packet,
        a fifth hardware-implemented pipelined processing device to receive the data packet from the fourth hardware-implemented pipelined processing device and remove at least one field from the data packet,
        a sixth hardware-implemented pipelined processing device to receive the data packet from the fifth hardware-implemented pipelined processing device and at least one of error check the data packet or perform anti-replay checking on the data packet, and
        a seventh hardware-implemented pipelined processing device to receive the data packet from the sixth hardware-implemented pipelined processing device and remove padding from the data packet, and
    where the plurality of hardware-implemented pipelined processing devices are separate from the one or more processing devices.

12. A network device, comprising:
    a plurality of interfaces, where each of the plurality of interfaces is coupled to a network link and each of the plurality of interfaces is to receive and forward data packets;
    an encryption card; and
    forwarding logic, which is separate from the encryption card, to:
        receive a data packet from a first one of the plurality of interfaces,
        determine whether the data packet requires encryption-related processing, and
        forward the data packet to the encryption card;
    where the encryption card comprises a plurality of pipelined hardware engines, including:
        a first one of the plurality of pipelined hardware engines to at least one of add a field to the data packet or add padding to the data packet, a second one of the plurality of pipelined hardware engines to receive the data packet from the first one of the plurality of pipelined hardware engines and rewrite a header of the data packet, a third one of the plurality of pipelined hardware engines to receive the data packet from the second one of the plurality of pipelined hardware engines and remove at least one field from the data packet, a fourth one of the plurality of pipelined hardware engines to receive the data packet from the third one of the plurality of pipelined hardware engines and at least one of encrypt or decrypt the data packet, and to add, to the data packet, status information to be used by a down stream pipelined hardware engine to determine whether to accept or drop the data packet, a fifth one of the plurality of pipelined hardware engines receive the encrypted or decrypted data packet from the fourth one of the plurality of pipelined hardware engines and remove at least one field from the data packet, a sixth one of the plurality of pipelined hardware engines to receive the data packet from the fifth one of the plurality of pipelined hardware engines and at least one of error check the data packet or perform anti-replay checking, and a seventh one of the plurality of pipelined hardware engines to receive the data packet from the sixth one of the plurality of pipelined hardware engines and remove padding from the data packet.

13. The network device of claim 12, where the forwarding logic is further to:
include at least one of security association information and program type information with the data packet prior to forwarding the data packet to the encryption card; and where the encryption card is to:
process the data packet in accordance with at least one of the security association information and the program type information.

14. The network device of claim 13, where the encryption card is further to:
forward the processed data packet to the forwarding logic; and where the forwarding logic is further to:
identify an output interface for the data packet, and
forward the data packet for output on the identified output interface.

* * * * *